United States Patent
Tsai et al.

(10) Patent No.: US 10,863,512 B2
(45) Date of Patent: Dec. 8, 2020

(54) POWER CONTROL SIGNALING FOR MULTIUSER SUPERPOSTION TRANSMISSION

(71) Applicant: HFI INNOVATION INC., Zhubei (TW)

(72) Inventors: Lung-Sheng Tsai, Tainan (TW); Chien-Hwa Hwang, Hsinchu County (TW); Tsang-Wei Yu, Hsinchu County (TW); Yi-Ju Liao, Hsinchu (TW); Pei-Kai Liao, Nantou County (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 15/277,709

(22) Filed: Sep. 27, 2016

(65) Prior Publication Data

US 2017/0094668 A1    Mar. 30, 2017

Related U.S. Application Data

(60) Provisional application No. 62/234,870, filed on Sep. 30, 2015, provisional application No. 62/328,035, filed on Apr. 27, 2016.

(51) Int. Cl.
*H04W 72/04* (2009.01)
*H04L 5/00* (2006.01)
(Continued)

(52) U.S. Cl.
CPC ...... *H04W 72/0473* (2013.01); *H04B 7/0619* (2013.01); *H04L 5/0091* (2013.01);
(Continued)

(58) Field of Classification Search
CPC ............. H04W 72/0473; H04W 52/16; H04W 52/346
See application file for complete search history.

(56) References Cited

U.S. PATENT DOCUMENTS

2007/0060167 A1    3/2007  Damnjanovic et al.
2009/0286497 A1*  11/2009  Akkarakaran ....... H04B 7/0848
                                                                    455/226.3
(Continued)

FOREIGN PATENT DOCUMENTS

CN    101383794 A    9/2007
CN    102547736 A    7/2012
(Continued)

OTHER PUBLICATIONS

International Search Report and Written Opinion of International Search Authority for PCT/CN2016/101042 dated Dec. 6, 2016 (11 pages).

(Continued)

*Primary Examiner* — Elton Williams
(74) *Attorney, Agent, or Firm* — Oblon, McClelland, Maier & Neustadt, L.L.P.

(57) ABSTRACT

Methods of enabling multiuser superposition transmission (MUST) in LTE systems are proposed. MUST operation allows simultaneous transmission for multiple co-channel users on the same time-frequency resources. A higher-layer signaling is used for configuring a UE to enable MUST. When a UE is configured by higher layer to enable MUST, the UE will monitor physical-layer control signaling carrying scheduling information and MUST-related information. Depending on whether MUST exists in each subframe, the UE derives the power allocation between the UE and its co-channel UE on allocated resource blocks. The UE also derives the power allocation based on whether it is configured for CRS-based transmission mode or DMRS-based transmission mode.

19 Claims, 4 Drawing Sheets

(51) Int. Cl.

| | |
|---|---|
| *H04W 52/28* | (2009.01) |
| *H04W 52/42* | (2009.01) |
| *H04W 52/16* | (2009.01) |
| *H04W 52/34* | (2009.01) |
| *H04B 7/06* | (2006.01) |
| *H04L 25/02* | (2006.01) |
| *H04B 7/0452* | (2017.01) |
| *H04W 52/00* | (2009.01) |
| *H04J 11/00* | (2006.01) |
| *H04L 25/03* | (2006.01) |
| *H04W 84/04* | (2009.01) |

(52) U.S. Cl.
CPC ......... *H04W 52/16* (2013.01); *H04W 52/283* (2013.01); *H04W 52/346* (2013.01); *H04W 52/42* (2013.01); *H04W 72/042* (2013.01); *H04B 7/0452* (2013.01); *H04B 7/0617* (2013.01); *H04J 11/004* (2013.01); *H04J 11/005* (2013.01); *H04L 5/003* (2013.01); *H04L 5/0037* (2013.01); *H04L 5/0044* (2013.01); *H04L 5/0048* (2013.01); *H04L 5/0073* (2013.01); *H04L 25/0202* (2013.01); *H04L 25/03898* (2013.01); *H04W 52/00* (2013.01); *H04W 84/042* (2013.01)

(56) References Cited

U.S. PATENT DOCUMENTS

| | | | |
|---|---|---|---|
| 2013/0003604 A1 | 1/2013 | Blankenship et al. | |
| 2013/0195032 A1* | 8/2013 | Goransson | H04W 52/16 370/329 |
| 2014/0242977 A1 | 8/2014 | Kim et al. | 455/423 |
| 2015/0078297 A1 | 3/2015 | Zheng | |
| 2015/0215061 A1 | 7/2015 | Tsai et al. | |
| 2015/0215103 A1 | 7/2015 | Tsai et al. | |
| 2016/0309542 A1* | 10/2016 | Kowalski | H03M 13/2707 |
| 2017/0126298 A1* | 5/2017 | Einhaus | H04B 7/0626 |
| 2017/0156079 A1 | 6/2017 | Tsai et al. | |
| 2017/0156080 A1 | 6/2017 | Tsai et al. | |
| 2017/0163367 A1 | 6/2017 | Tsai et al. | |
| 2017/0230135 A1* | 8/2017 | Oh | H04L 1/001 |
| 2018/0069651 A1* | 3/2018 | Davydov | H04L 5/0001 |

FOREIGN PATENT DOCUMENTS

| | | |
|---|---|---|
| CN | 102577594 A | 7/2012 |
| WO | WO 2015/113508 A1 | 8/2015 |

OTHER PUBLICATIONS

3GPP TSG RAN WG1 Meeting #82 R1-153798, Huawei et al., Classification of MUST Schemes, Beijing, China dated Aug. 24-28, 2015 (8 pages).

3GPP TSG WG1 Meeting #82 R1-154454, MediaTek Inc., Multiuser Superposition Transmission Scheme for LTE, Beijing, China dated Aug. 24-28, 2015 (12 pages).

Extended European Search Report dated Nov. 29, 2018 in Patent Application No. 16850390.2, 14 pages.

"Potential Assistance Information for Multiuser Superposition Transmission" Innovative Technology Lab Co: 3GPP TSG RAN WG1 Meeting #82bis, RI-155774, vol. RAN WG1, No. Malmo, Sweden, XP051021752, Sep. 26, 2015, p. 1-3.

"High Level Signalling of NOMA for Multiuser Superposition Transmission" ITL: 3GPP TSG RAN WG1 Meeting #82, RI-154547, vol. RAN WG1, No. Beijing, XP051001817, Aug. 23, 2015, pp. 1-3.

"Enhancements to Support Downlink Multiuser Superposition" Alcatel-Lucent Shanghai Bell, Alcatel-Lucent, 3GPP TSG RAN WG1 Meeting #82bis, RI-155252, vol. RAN WG1, No. Malmo, Sweden, XP051021489, Sep. 26, 2015, 5 Pages.

Discussion on potential enhancements for downlink superposition transmission; 3GPP TSG RAN WG1 Meeting #82bis; Malmo, Sweden, Oct. 5-9, 2015, R1-155218.

Office Action dated Dec. 10, 2019 in Chinese Application No. 201680008026.8.

Indian Office Action dated May 8, 2020 in Indian Patent Application No. 201827011411, 7 pages.

* cited by examiner

| SCENARIO | SCENARIO 1 | SCENARIO 2 | SCENARIO 3 |
|---|---|---|---|
| FAR UE MODULATION | QPSK | QPSK | FAR UE is QAM, spatial multiplexed, or MU-MIMO |
| OTHER FEATURE | NO NAICS | NAICS | |
| NEAR UE POWER | $(1-\alpha) \times D2P_x \times P$ | $((1-\alpha)/\alpha) \times D2P_{NAICS} \times P$ | $((1-\alpha)/\alpha) P_{far}$ |
| FAR UE POWER | $\alpha \times D2P_x \times P$ | $D2P_{NAICS} \times P$ | $P_{far}$ |

POWER CONTROL SIGNALING FOR MULTIUSER SUPERPOSTION TRANSMISSION

CROSS REFERENCE TO RELATED APPLICATIONS

This application claims priority under 35 U.S.C. § 119 from U.S. Provisional Application No. 62/234,870, entitled "Power Control Signaling and Apparatus for Multiuser Superposition Transmission," filed on Sep. 30, 2015; U.S. Provisional Application No. 62/328,035, entitled "Power Control for Multiuser Superposition Transmission," filed on Apr. 27, 2016, the subject matter of which is incorporated herein by reference.

TECHNICAL FIELD

The disclosed embodiments relate generally to mobile communication networks, and, more particularly, to methods of enabling multiuser superposition transmission in mobile communication systems.

BACKGROUND

Long Term Evolution (LTE) is an improved universal mobile telecommunication system (UMTS) that provides higher data rate, lower latency and improved system capacity. In LTE systems, an evolved universal terrestrial radio access network includes a plurality of base stations, referred as evolved Node-Bs (eNBs), communicating with a plurality of mobile stations, referred as user equipment (UE). A UE may communicate with a base station or an eNB via the downlink and uplink. The downlink (DL) refers to the communication from the base station to the UE. The uplink (UL) refers to the communication from the UE to the base station. LTE is commonly marketed as 4G LTE, and the LTE standard is developed by 3GPP.

In a wireless cellular communications system, multiuser multiple-input multiple-output (MU-MIMO) is a promising technique to significantly increase the cell capacity. In MU-MIMO, the signals intended to different users are simultaneously transmitted with orthogonal (or quasi-orthogonal) precoders. On top of that, the concept of a joint optimization of MU operation from both transmitter and receiver's perspective has the potential to further improve MU system capacity even if the transmission and precoding is non-orthogonal. For example, the simultaneous transmission of a large number of non-orthogonal beams/layers with the possibility of more than one layer of data transmission in a beam. Such non-orthogonal transmission could allow multiple users to share the same resource elements without spatial separation, and allow improving the multiuser system capacity for networks with a small number of transmit antennas (i.e. 2 or 4, or even 1), where MU-MIMO based on spatial multiplexing is typically limited by wide beamwidth.

Multi-user superposition transmission (MUST) is a new technique of such joint optimization associated with power allocation and interference cancellation to enable high system capacity in LTE networks. It is under investigation in LTE Release-14. It may include two commonly discussed multi-user transmission approaches, MU-MIMO, and non-orthogonal multiple access (NOMA). The MU-MIMO approach transmits signals intended to different users with orthogonal (or quasi-orthogonal) precoders. In contrast, the NOMA approach tends to precode transmitted signals for co-channel users by same spatial direction with un-equal power allocation.

MUST technique is not limited to MU-MIMO or NOMA; it allows simultaneous transmission for multiple users on the same time-frequency resources. A serving base station pairs two or more users together, and applies transmit beamforming (precoding) derived from channel information feedback to achieve transmission of multiple transport-blocks to multiple users. The used precoder for each user could be the same or not. As a result, one may expect that the mutual interference between the co-channel transmissions to multiple mobile stations would degrade performance seriously. Fortunately, with a proper design on the power allocation, the code-rate, and modulation order of the co-channel signals, and some assisted information for the signal format of un-wanted interference, it is possible to let a UE cancel the unwanted co-channel interference intended for other UEs. However, the assisted information for MUST may be related to some parameters already defined in early releases of LTE, e.g., the amount of allocated power for MUST Physical Downlink Shared Channel (PDSCH). Additional designs thus are needed to support MUST operation.

SUMMARY

Methods of enabling multiuser superposition transmission (MUST) in LTE systems are proposed. MUST operation allows simultaneous transmission for multiple co-channel users on the same time-frequency resources. A higher-layer signaling is used for configuring a UE to enable MUST. When a UE is configured by higher layer to enable MUST, the UE will monitor physical-layer control signaling carrying scheduling information and MUST-related information. Depending on whether MUST exists in each subframe, the UE derives the power allocation between the UE and its co-channel UE on allocated resource blocks. The UE also derives the power allocation based on whether it is configured for CRS-based transmission mode or DMRS-based transmission mode.

In one embodiment, a user equipment (UE) receives a higher-layer signaling from a base station in a mobile communication network to determine whether multiuser superposition transmission (MUST) is enabled. The UE receives a physical-layer control signaling containing MUST-related information if MUST is enabled. The physical-layer control signaling indicates whether MUST exists on allocated resource blocks. The UE derives an amount of power allocated to the UE and a co-channel UE on the allocated resource blocks. The power allocated to the UE is based on a value for a data to pilot (D2P) ratio if MUST exists. The UE decodes data information intended to the UE according to the derived power information.

In another embodiment, a user equipment (UE) receives a higher-layer signaling from a base station in a mobile communication network to determine whether multiuser superposition transmission (MUST) is enabled. The UE is configured to be in a cell-specific reference signal (CRS) based transmission mode or UE-specific reference signal (DM-RS) based transmission mode. The UE derives an amount of power allocated to the UE and a co-channel UE on the allocated resource blocks. The power allocated to the UE is based on a first predetermined rule if CRS based transmission mode is configured, and based on a second predetermined rule if DM-RS based transmission mode is configured. The UE decodes data information intended to the UE according to the derived power information.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
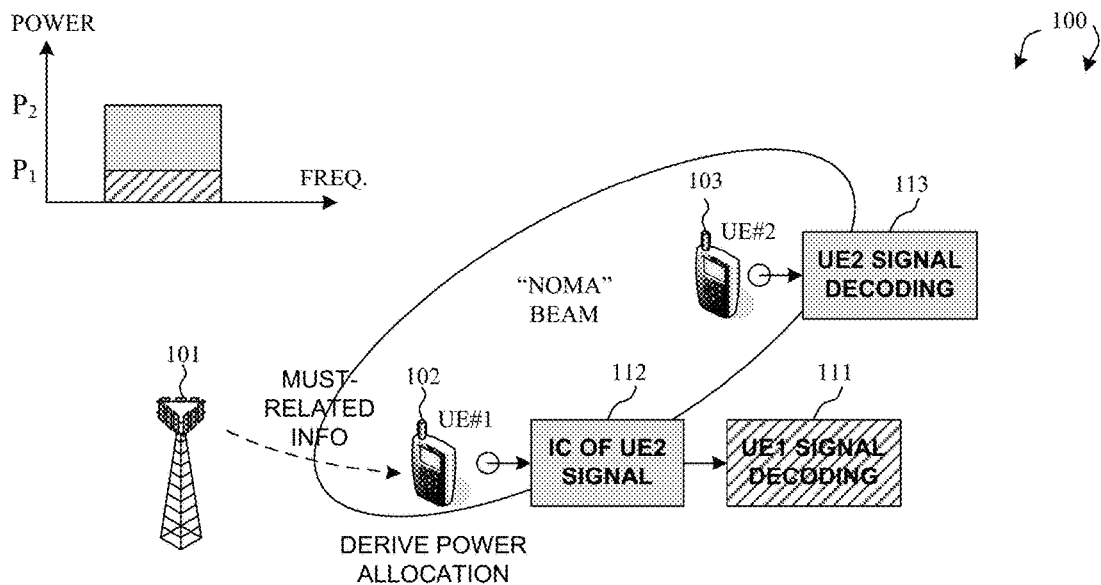
FIG. 1 illustrates a mobile communication network supporting multiuser superposition transmission (MUST) operation in accordance with one novel aspect.

FIG. 1 illustrates a mobile communication network 100 supporting multiuser superposition transmission (MUST) operation in accordance with one novel aspect. Mobile communication network 100 is an OFDM network comprising a serving base station eNB 101, a first user equipment 102 (UE #1), and a second user equipment 103 (UE #2). In 3GPP LTE system based on OFDMA downlink, the radio resource is partitioned into subframes in time domain, each subframe is comprised of two slots. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. REs are grouped into resource blocks (RBs), where each RB consists of 12 consecutive subcarriers in one slot.

Several physical downlink channels and reference signals are defined to use a set of resource elements carrying information originating from higher layers. For downlink channels, the Physical Downlink Shared Channel (PDSCH) is the main data-bearing downlink channel in LTE, while the Physical Downlink Control Channel (PDCCH) is used to carry downlink control information (DCI) in LTE. The control information may include scheduling decision, information related to reference signal information, rules forming the corresponding transport block (TB) to be carried by PDSCH, and power control command. For reference signals, Cell-specific reference signals (CRS) are utilized by UEs for the demodulation of control/data channels in non-precoded or codebook-based precoded transmission modes, radio link monitoring and measurements of channel state information (CSI) feedback. UE-specific reference signals (DM-RS) are utilized by UEs for the demodulation of control/data channels in non-codebook-based precoded transmission modes.

Multi-user superposition transmission (MUST) allows simultaneous transmission for multiple users on the same time-frequency resources. A base station pairs two or more users together and applies transmit beamforming (precoding) and power allocation derived from channel information feedback to achieve transmission of multiple transport-blocks to multiple users. The used precoder for each user may be the same or not. The allocated power for superposed users is related to channel quality of the users. As a result, one may expect that the mutual interference between the co-channel transmissions to multiple mobile stations would degrade performance seriously. Fortunately, with a proper design on the power allocation, the code-rate, and modulation order of the co-channel signals, and some assisted information for the signal format of un-wanted interference, it is possible to let a UE remove the unwanted co-channel interference intended for other superposed UEs.

In the example of FIG. 1, downlink multiuser superposition transmission (MUST) scheme is used. In MUST, the signals intended for two users are superposed and occupy the same time-frequency radio resource. To benefit from MUST, the two co-scheduled users generally need to have a large difference in the received signal quality, e.g., in terms of the received signal-to-interference-plus-noise ratio (SINR). In a typical scenario, one of the users (e.g., UE #1) is geometrically close to the base station, and the other user (e.g., UE #2) is geometrically far away from the base station. The former user and the latter user are also referred to as the near-user and the far-user respectively.

As shown in FIG. 1, near-user UE #1 receives intra-cell interfering radio signal 112 transmitted from the same serving eNB 101 due to non-orthogonal multiple access (NOMA) operation intended for multiple UEs (e.g., far-user UE #2) in the same serving cell. For NOMA operation, the signals to the two UEs are superposed and precoded with the same precoder and transmitted over the same spatial layer (the "NOMA" beam). UE #1 may be equipped with an interference cancellation (IC) receiver that is capable of cancelling the contribution of the interfering signal 112 from the desired signal 111. UE #2 receives and decodes its own desired signal 113.

Typically, the transmit power allocated for the signal dedicated to the far-user (UE #2) $P_2$ is in general much stronger than to the near-user (UE #1) $P_1$. It can be shown that such power allocation strategy maximizes the system throughput in the sense of proportional fairness. From UE #1's perspective, since it is much close to eNB 101 and has a better received quality of UE #2's signal than UE #2 does, UE #1 can decode the signal dedicated to UE #2. After UE #1 decodes UE #2's information bits, the signal dedicated to UE #2 is reconstructed and then subtracted from the received signal to form a clean received signal. UE #1 can therefore decode its own signal via the clean received signal. The operation of NOMA thus requires each co-channel UE (especially the near-user) to acquire assistance information from the network to reconstruct and cancel the interfering signal.

In LTE system, before decoding the desired data information carried by PDSCH, a UE needs to check all possible E/PDCCH locations to detect the E/PDCCH transmission used to carry DCI intended for it and then extract the control information corresponding to its PDSCH signal. In LTE Release-12, there are 10 transmission modes (TMs) specified. Each TM is associated with two possible transmission schemes [36.213] and each scheme is associated with a DCI format. For example, DCI format 1A and format 2 are used for TM 4. DCI format 1A is corresponding to transmit diversity (TxD) and DCI format 2 is for closed-loop spatial multiplexing. Once a UE is configured to a certain transmission mode (TM), it should decode the used DCI format carried in its detected PDCCH to exactly know the transmission scheme of the scheduled PDSCH. To further support MUST operation, new DCI formats may be introduced to carry MUST-related information.

For scheduling flexibility and optimized system performance, the base station may switch between MUST and non-MUST operation dynamically. If the dynamic switch between MUST and non-MUST operation is allowed in the network, whether MUST operation exists in the data transmission in this time slot can be implied by a default value of one or multiple fields within the assisted information related to the co-scheduled or superposed data transmission(s). After knowing MUST operation does exist, a UE may perform interference cancellation based on the received MUST-related information, e.g., power ratio between co-scheduled users and MCS/MOD(s) of co-scheduled users. It is also possible to the receiver obtain the above information by blind detection. However, MUST parameters, e.g., the amount of allocated power for MUST PDSCH, may be related to legacy parameters already defined in early releases, some modifications are needed to support MUST operation. Depending on whether MUST exists in each subframe, the UE derives the power allocation between the UE and its co-channel UE on allocated resource blocks. The UE also derives the power allocation based on whether it is configured for CRS-based transmission mode or DMRS-based transmission mode.

Figure 2:
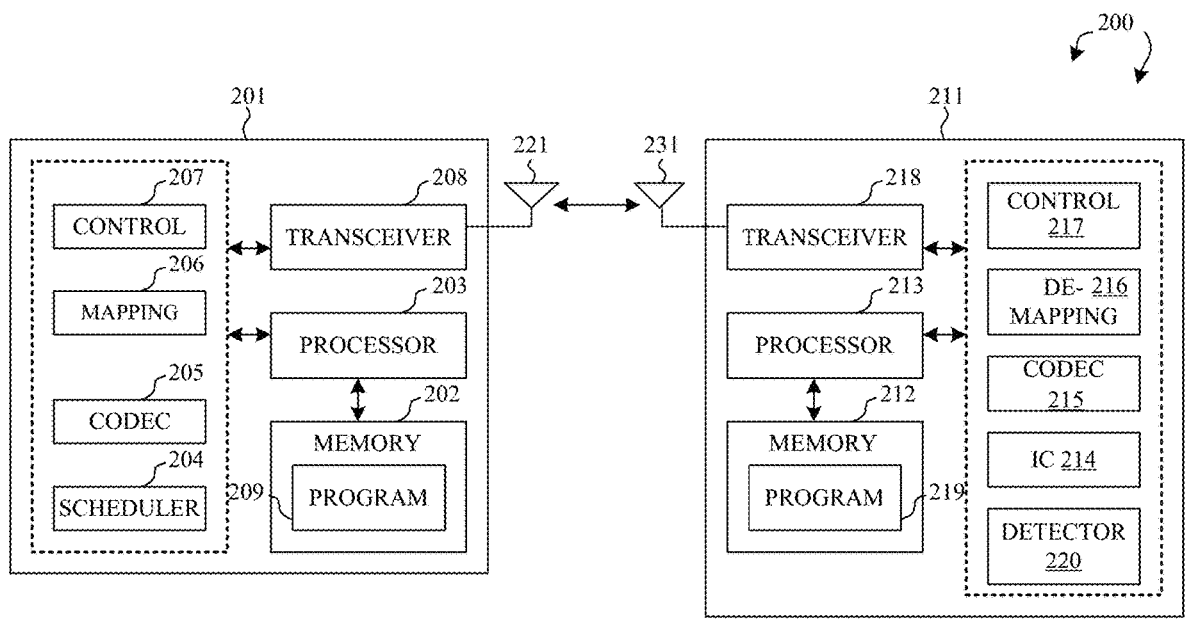
FIG. 2 is a simplified block diagram of a base station and a user equipment that carry out certain embodiments of the present invention.

FIG. 2 is a simplified block diagram of a base station 201 and a user equipment 211 that carry out certain embodiments of the present invention in a mobile communication network 200. For base station 201, antenna 221 transmits and receives radio signals. RF transceiver module 208, coupled with the antenna, receives RF signals from the antenna, converts them to baseband signals and sends them to processor 203. RF transceiver 208 also converts received baseband signals from the processor, converts them to RF signals, and sends out to antenna 221. Processor 203 processes the received baseband signals and invokes different functional modules to perform features in base station 201. Memory 202 stores program instructions and data 209 to control the operations of the base station. Similar configuration exists in UE 211 where antenna 231 transmits and receives RF signals. RF transceiver module 218, coupled with the antenna, receives RF signals from the antenna, converts them to baseband signals and sends them to processor 213. The RF transceiver 218 also converts received baseband signals from the processor, converts them to RF signals, and sends out to antenna 231. Processor 213 processes the received baseband signals and invokes different functional modules to perform features in UE 211. Memory 212 stores program instructions and data 219 to control the operations of the UE.

Base station 201 and UE 211 also include several functional modules and circuits to carry out some embodiments of the present invention. The different functional modules and circuits can be configured and implemented by software, firmware, hardware, or any combination thereof. The function modules, when executed by the processors 203 and 213 (e.g., via executing program codes 209 and 219), for example, allow base station 201 to schedule (via scheduler 204), encode (via codec 205), mapping (via mapping circuit 206), and transmit control information and data (via control circuit 207) to UE 211, and allow UE 211 to receive, de-mapping (via de-mapper 216), and decode (via codec 215) the control information and data (via control circuit 217 and detector 220) accordingly with interference cancellation capability. In one example of MUST operation, base station 201 provides assistant information that include parameters related to interfering signals to UE 211. Upon receiving the related parameters via higher-layer (RRC) signaling and physical-layer (PDCCH) control signaling, UE 211 is then able to perform interference cancellation via interference canceller 214 to cancel the contribution of the co-channel interfering signals accordingly. Specifically, UE 211 is able to derive power allocation between the UE and its co-channel UE for MUST operation.

Figures 3, 4:
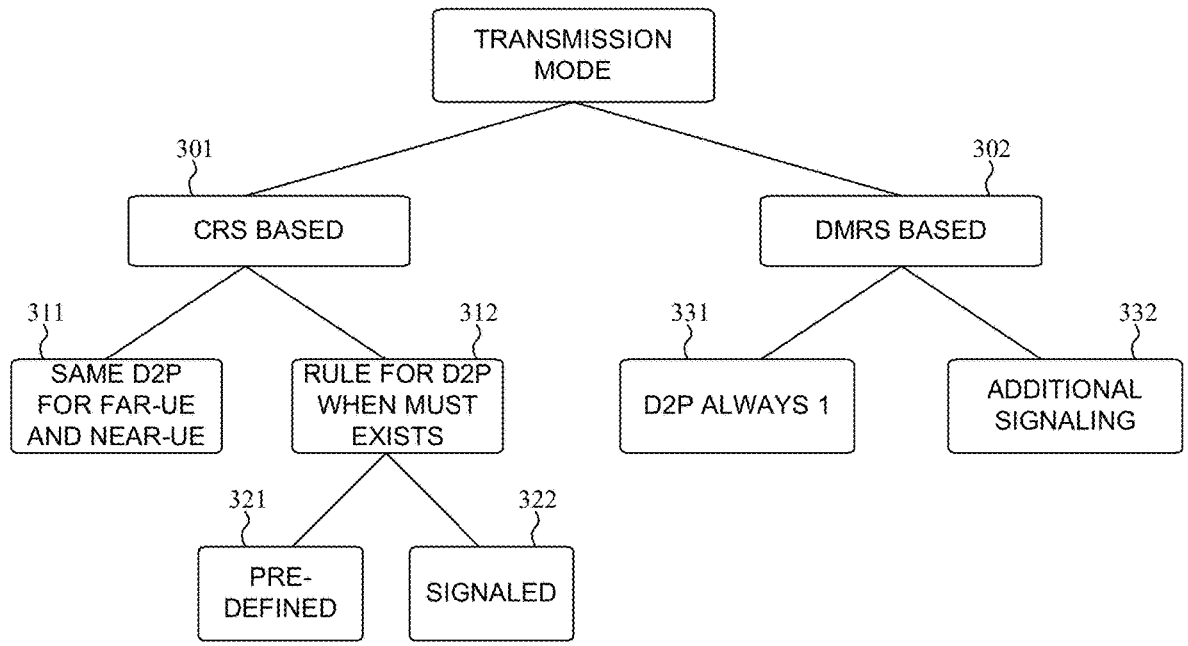
FIG. 3 illustrates various embodiments for determining allocated PDSCH power for MUST in accordance with one novel aspect.
FIG. 4 illustrates different examples of power allocation for MUST users.

FIG. 3 illustrates various embodiments for determining allocated PDSCH power for MUST in accordance with one novel aspect. In CRS-based TMs (301), the PDSCH power is usually derived from a signaled ratio of PDSCH power to CRS power, where the transmit CRS power is the same to all UEs served by the same base-station. In LTE, the ratio of PDSCH EPRE (Energy Per Resource Element) to CRS EPRE among PDSCH REs for each OFDM symbol is denoted by either $\rho_A$ or $\rho_B$ according to the OFDM symbol index. These two parameters $\rho_A$ and $\rho_B$ are UE-specific, and they are derived from two high-layer configurable values: $P_A$ and $P_B$. The parameter $P_A$ is UE-specific and $P_B$ is cell-specific. The ratio of PDSCH EPRE (Energy Per Resource Element) to CRS EPRE is referred to as "D2P (data-to-pilot) ratio", which means either $\rho_A$ or $\rho_B$, to facilitate the following demonstration. In other words, the D2P ratio within one OFDM symbol is determined by $P_A$ and $P_B$.

Consider the UE behavior determining the scheduled PDSCH power when a UE is co-scheduled with another UE. Because this D2P ratio is UE-specific, the network may have trouble to schedule two users by MUST if the two users are configured with different D2P ratio settings, and meanwhile network needs to let at least the near-user, who jointly decodes its signal and also far-user's signal, know the used D2P value. For example, suppose two co-scheduled users, user A and user B, are allocated with 0.2P and 0.8P, where P is total transmit power, while the D2P ratio is 1 for user A and is 2 for user B. Defining the power ratio factor to be signaled through control channel as the ratio of scheduled PDSCH power to total transmit PDSCH power, user A is signaled by 0.2 and user B is signaled by 0.8. Following the original interpretation of D2P ratio and supposing that the CRS power is P, user A will interpret that the total transmit PDSCH power is P, its desired signal is of power 0.2P, and the power allocated to user B is 0.8P. Because the D2P ratio configured by RRC for user B is 2, user B will interpret that the total transmit PDSCH power is 2P, its desired signal power is of power 1.6P, and the power allocated to user A is 0.4P. As a result, the power information is not correctly recovered at UE side. This incorrect power information may lead to demodulation error for amplitude-modulated data signals (e.g., QAM modulated) and cause problem for co-channel interference cancellation.

There are several solutions to solve the problem. As illustrated in FIG. 3, in one embodiment depicted by 311, the network may only apply MUST in CRS-based TMs for users with the same configuration of D2P ratio. In this way UEs still follow the configured D2P ratio to decode their data signal. However, this approach significantly limits network's scheduling flexibility to pair two UEs for MUST. In another embodiment depicted by 312, a UE can follow another rule different from the legacy rule to determine its D2P ratio only when the UE is receiving PDSCH with MUST. For example, the UE follows a predefined rule that its D2P ratio is always one if the control signaling implies the PDSCH in the same subframe is with MUST (321). Alternatively, to provide more flexibility, a new higher-layer configured the D2P ratio could be introduced and then all UEs with MUST PDSCH follow this configuration for the MUST subframes (322).

Since MUST PDSCH may not occur for all scheduled subframes, UE may fallback to non-MUST behavior, i.e., following the legacy D2P ratio, if the control signaling indicates the PDSCH to be received is not with MUST. A UE may know whether current subframe is with MUST or not though RRC signaling, detecting DCI format, decoding the information contained in DCI fields, or by blind detection for the presence of co-scheduled signal(s). A simple way to indicate the fallback operation could be using a default value on some field(s) carried by the control signal. For example, indicate the power ratio of scheduled PDSCH power to total transmit PDSCH power as one.

On the other hands, for DMRS-based TMs (302), the power of PDSCH signal can be directly derived from the received DMRS in the same subframe, if separated DMRS ports are associated with the PDSCH UEs. Thus when operating with MUST, a UE may follow the legacy behavior that assumes the D2P ratio of PDSCH EPRE to DMRS EPRE is 1 to know the amount of power allocated to its PDSCH (as depicted by 331). However, there are some disadvantages based on this approach. The first one is the DBMS overhead. At least two DMRS ports are needed for co-channel scheduling. Another disadvantage is the power of the DBMS associated with either MUST-near user's PDSCH or MUST-far user's PDSCH needs to be scaled down to maintain that PDSCH EPRE to DMRS EPRE is 1. This may cause problem for channel estimation at UE-side because the pilot power is significantly reduced. Therefore, an alternative approach is to still adopt single DMRS port for two superposed users and keep that the ratio of total PDSCH EPRE to DMRS EPRE is 1, while the ratio of scheduled PDSCH power to total transmit PDSCH power is additionally provided from network or blindly detected by UE itself (as depicted by 332). This is similar to the CRS-based TMs except that the network does not need to signal precoding information, which is already carried by DMRS.

FIG. 4 illustrates different examples of power allocation for MUST users. It was considered to restrict MUST-far users to use QPSK only. This restriction may facilitate the design of power allocation for the MUST scenarios where co-scheduled users are configured with different D2P values. Under this QPSK restriction, the data information for a MUST far-user is carried by phase but not amplitude of the transmitted symbol so it is fine for network to allocate users' power without considering the D2P value of the MUST far-user. The MUST far-user is still capable to correctly recover data information without knowing the actual D2P ratio.

Suppose there are two co-scheduled users, one MUST near-user and one MUST far-user, with D2P values configured to $D2P_{near}$ and $D2P_{far}$, respectively, and CRS power is P. The MUST near-user is supposed to jointly decode both its own signal and also the signal intended for MUST far-user. We consider the following possible scenarios as illustrated in FIG. 4. Scenario 1: Far-user uses QPSK and it is not activated to support NAICS. Scenario 2: Far-user uses QPSK and it is activated to support NAICS. Scenario 3: Far-user is QAM modulated, spatial multiplexed with more than one layer, or associated with the multi-user MIMO (MU-MIMO) transmission scheme.

For Scenario 1, assume that the total transmit power is $D2P_x \times P$, the network could allocate power to the MUST near-user's PDSCH by $(1-\alpha) \times D2P_x \times P$ and to the MUST far-user's PDSCH by $\alpha \times D2P_x \times P$, where a is the power ratio of MUST far-user's PDSCH power to total transmit PDSCH power and the value of $\alpha$ is between 0.5 and 1. Here the value of $D2P_x$ could be high-layer configured (or say, derived from a high-layer configured value) or could be $D2P_{near}$ by-default. It could be UE-specific.

For Scenario 2, although it is similar to Scenario 1 that the data information for far-user is carried by phase but not amplitude of the transmitted symbol, however, the far-user who is activated to support NAICS may jointly decode its QPSK signal and also interference signal from neighboring cells. Therefore, the far-user has to exactly know the amplitude information of its QPSK signal. This information is indicated by a high-layer configured parameter defined as servCellp-a-r12, which is newly introduced in Release-12 to support NAICS operation and implies that the D2P ratio of the QPSK modulated far-user is derived from $P_A$=servCellp-a-r12. Here we let $D2P_{NAICS}$ denote this D2P ratio to ease the following discussion. To enable to coexistence of NAICS and MUST, one possible approach is that, network follows the power allocation rule above for the MUST far-user, so the power of MUST far-user's PDSCH is $D2P_{NAICS} \times P$. Then the power of MUST near-user is $((1-\alpha)/\alpha) \times D2P_{NAICS} \times P$, and the total transmit power on PDSCH is $(1/\alpha) \times D2P_{NAICS} \times P$. The MUST far-user then follows its legacy behavior as there is no other co-scheduled PDSCH transmitted from its serving cell. At MUST near-user side, this MUST near-user has to know the power allocation rule above to jointly decode its own signal and also the signal intended for MUST far-user. In other words, the MUST near-user needs to know: 1) $\alpha$, the power ratio of MUST far-user's PDSCH power to total transmit PDSCH power, and $D2P_{NAICS}$; 2) the allocated power of MUST near-user's PDSCH is given by $((1-\alpha)/\alpha) \times D2P_{NAICS} \times P$ but not $(1-\alpha) \times D2P_{near} \times P$ when NAICS and MUST are both enabled; and 3) the allocated power of MUST far-user's PDSCH is given by $D2P_{NAICS} \times P$ when NAICS and MUST are both enabled.

The information above could be provided to the MUST near-user from network or blindly decoded by the MUST near-user itself. Also, the MUST near-user may also need to know the power-allocation rule in either Scenario 1 or Scenario 2 is applied through network signaling or blind detection. The D2P power ratio of the far-UE can be predefined or semi-statically configured to the UE from a high layer. If blind detection is not avoidable, we may reduce the number of possible values of servCellp-a-r12 and let the subset of possible servCellp-a-r12 values be cell-specific and configurable though high layer to reduce blind-detection complexity. For example, similar to one parameter p-aList-r12 defined in for NAICS, we may introduce a high-layer configurable list, servCellp-aList, to indicate possible values of servCellp-a-r12 and limit the number of values in serv-Cellp-aList. The number of values in servCellp-aList could be one.

Scenario 3 is a special scenario with $\rho_A$ specified as follows. $\rho_A$ is equal to $\delta_{power\text{-}offset}+P_A+10\log_{10}(2)$ [dB] when the UE receives a PDSCH data transmission using precoding for transmit diversity with 4 cell-specific antenna ports; $\rho_A$ is equal to $\delta_{power\text{-}offset}+P_A$ [dB] otherwise, where $\delta_{power\text{-}offset}$ is 0 dB for all PDSCH transmission schemes except multi-user MIMO and where $P_A$ is a UE specific parameter provided by higher layers. Similar to Scenario 2, we may keep MUST far-user's assumption on its PDSCH power, which is derived based on the value of $\rho_A$ specified above, no matter there is another co-scheduled user or not on the same resource and the same spatial layer(s). Let's denote the amount of MUST far-user's power on a spatial layer by $P_{far}$. Then the power allocated to MUST near-user's PDSCH on the same resource and the same spatial layer would be $((1-\alpha)/\alpha) P_{far}$, where $\alpha$ is the power ratio of MUST far-user's PDSCH power to total transmit PDSCH power on the considered resource and spatial layer.

Another approach to solve the issues in Scenario 2 and 3 is to limit MUST operation for only MUST-capable users and follow a set of new rules to determine the allocated power on their PDSCH signals, without considering the legacy power allocation rules defined in early releases. For example, always follow the power allocation rules defined for Scenario 1 and provide sufficient information so that both MUST near UE and MUST far UE know the power information for further signal processing of MUST and/or NAICS. However, this approach limits the scope of using MUST and NAICS to only advanced UEs but not early-released legacy UEs.

Figure 5:
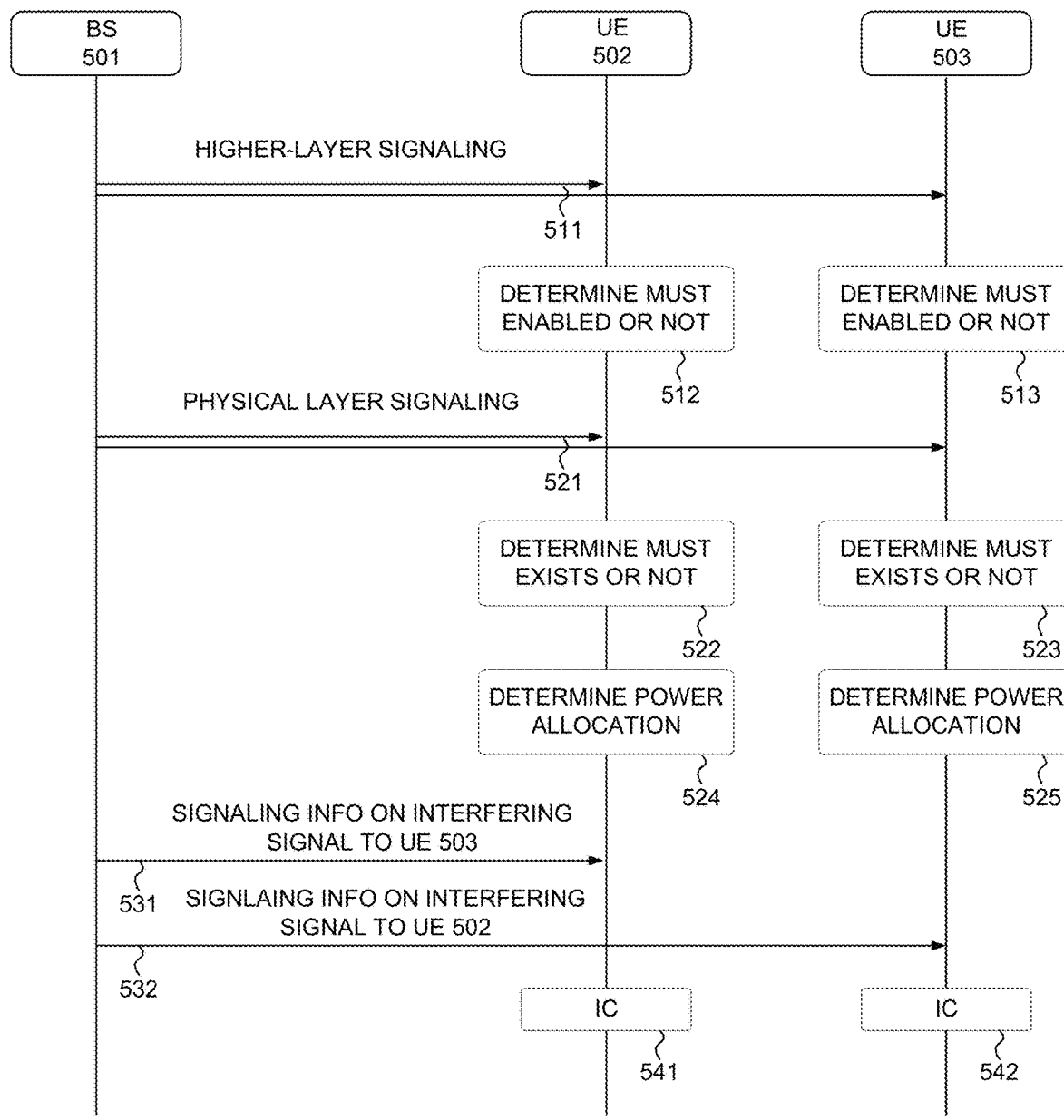
FIG. 5 illustrates a downlink MUST configuration and operation between a BS and two co-channel UEs in accordance with one novel aspect.

FIG. 5 illustrates a downlink MUST configuration and operation between a BS and two co-channel UEs in accordance with one novel aspect. In step 511, BS 501 sends semi-static higher-layer signaling (RRC message) to UE 502 and UE 503 for enabling or disabling MUST operation for a configured transmission mode. In step 512, UE 502 determines whether MUST is enabled or not. In step 513, UE 503 determines whether MUST in enabled or not. In step 521, BS 501 sends dynamic physical-layer signaling to multiple UEs including UE 502 and UE 503 for data transmission under NOMA operation on a subframe basis via PDCCH signaling and PDSCH data transmission. In step 522, UE 502 determines whether MUST exists on a subframe basis. In step 523, UE 503 determines whether MUST exists on a subframe basis. In step 524, UE 502 determines power allocation based on the high-layer and physical-layer signaling. In step 525, UE 502 determines power allocation based on the high-layer and physical-layer signaling. In step 531, BS 501 signals UE 502 scheduling information about interfering signals dedicated to UE 503. In step 532, BS 501 signals UE 503 scheduling information about interfering signals dedicated to UE 502. Note that such information may be signaled separately or aggregated together in one message. In step 541, UE 502 performs IC based on the received information. In step 542, UE 503 performs IC based on the received information. In an alternative embodiment, either UE 502 or UE 503 (e.g., the near-user) performs IC.

New DCI formats that contain MUST-related information are needed to support MUST operation. They may contain a full set or a subset of the following information: Power allocation among co-scheduled or superposed users; Modulation order (MOD) or modulation and coding scheme (MCS) of the other co-scheduled or superposed UE(s); Resource allocation of the other co-scheduled or superposed UE(s). If the DCI overhead carrying MUST-related information is a concern, it is possible to leverage UE 's capability to blindly detect some of the parameters listed above without signaling in DCI formats, e.g. MOD(s) of the other superposed UE(s) and transmission scheme of the other superposed UE(s). However, it may degrade the receiver performance due to the uncertainty of parameter detection.

Alternatively, eNB's scheduling enforces that some parameters should be consistent on all scheduled resource blocks, to avoid UE 's blind detection and the signaling of these parameters in a per-RB based way, which leads to huge signaling overhead. Thus eNB may adopt at least one of the following options to support MUST for superposed UEs. Option 1: for each UE, eNB may allocate PDSCH power to each UE such that the ratio between the allocated PDSCH power of this UE and total transmit PDSCH power is the same at all allocated resource blocks of this UE. Option 2: for each UE, eNB may assign the same modulation order to the other co-scheduled UE(s) at all allocated resource blocks of this UE. Option 3: for each UE, eNB may assign its co-scheduled UE by the same set of resource blocks which are signaled in DCI format.

Option 1 and option 2 together make it possible to jointly indicate power allocation and MOD of all superposed users by a configuration index of a look-up table to save overhead. Some combinations of power ratio and MOD are not feasible for MUST operation. For example, a power ratio close to 0.5 and two co-scheduled users are all assigned by 64QAM is difficult for perfect interference cancellation. Thus a look-up table can be defined to contain all feasible combinations of power ratio and MOD, and then eNB only needs to indicate in DCI format which combination is used. Option 3 relieves the signaling burden to support CWIC due to no need of additional resource allocation signaling for the other co-scheduled user.

Based on the received DCI format, corresponding to each option for eNB above, UE may have the following behavior to obtain power information or obtain modulation order information without blind detection. If a UE is signaled that MUST is applied in current subframe, it assumes that the power ratio of its scheduled PDSCH power to total transmit PDSCH power is the same over all allocated resource blocks. If a UE is signaled that MUST is applied in current subframe, it assumes that the modulation order of the co-scheduled UE(s) at the allocated resource blocks is the same. If a UE is signaled that MUST is applied in current subframe, it assumes that there is only one co-scheduled UE who is with the same set of allocated resource blocks.

Figure 6:
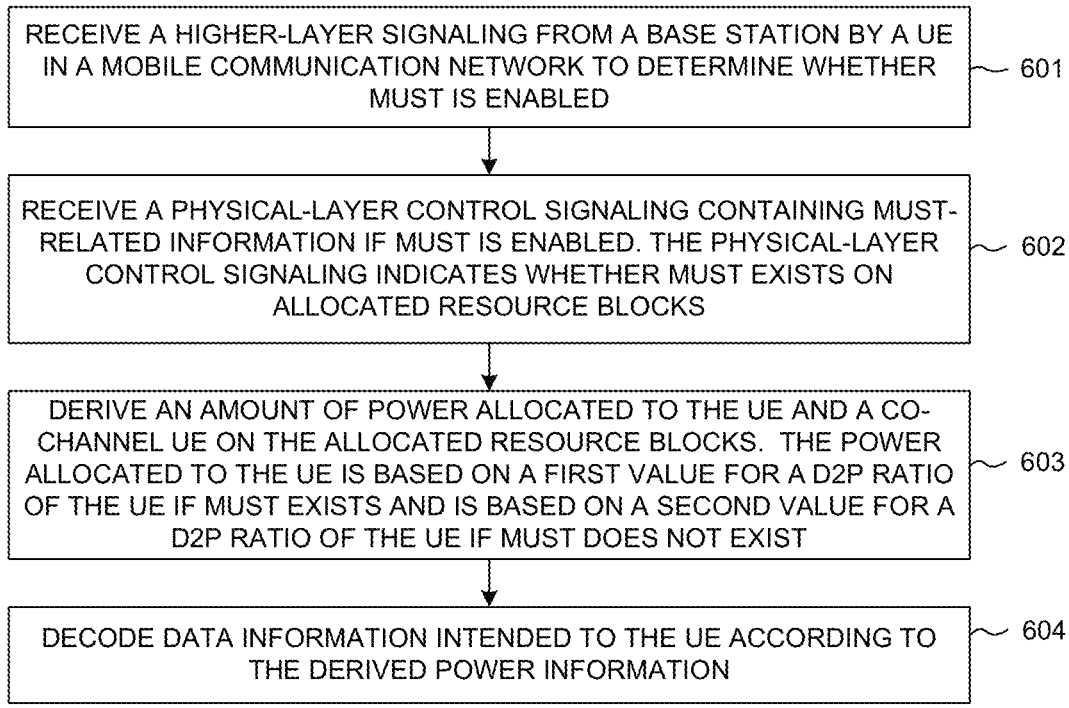
FIG. 6 is a flow chart of a method of power allocation for CRS transmission mode under MUST operation from UE perspective in accordance with one novel aspect.

FIG. 6 is a flow chart of a method of power allocation for CRS transmission mode under MUST operation from UE perspective in accordance with one novel aspect. In step 601, a user equipment (UE) receives a higher-layer signaling from a base station in a mobile communication network to determine whether multiuser superposition transmission (MUST) is enabled. In step 602, the UE receives a physical-layer control signaling containing MUST-related information if MUST is enabled. The physical-layer control signaling indicates whether MUST exists on allocated resource blocks. In step 603, the UE derives an amount of power allocated to the UE and a co-channel UE on the allocated resource blocks. The power allocated to the UE is based on a first value for a data to pilot (D2P) ratio of the UE if MUST exists and is based on a second value for a D2P ratio of the UE if MUST does not exist. In step 604, the UE decodes data information intended to the UE according to the derived power information.

Figure 7:
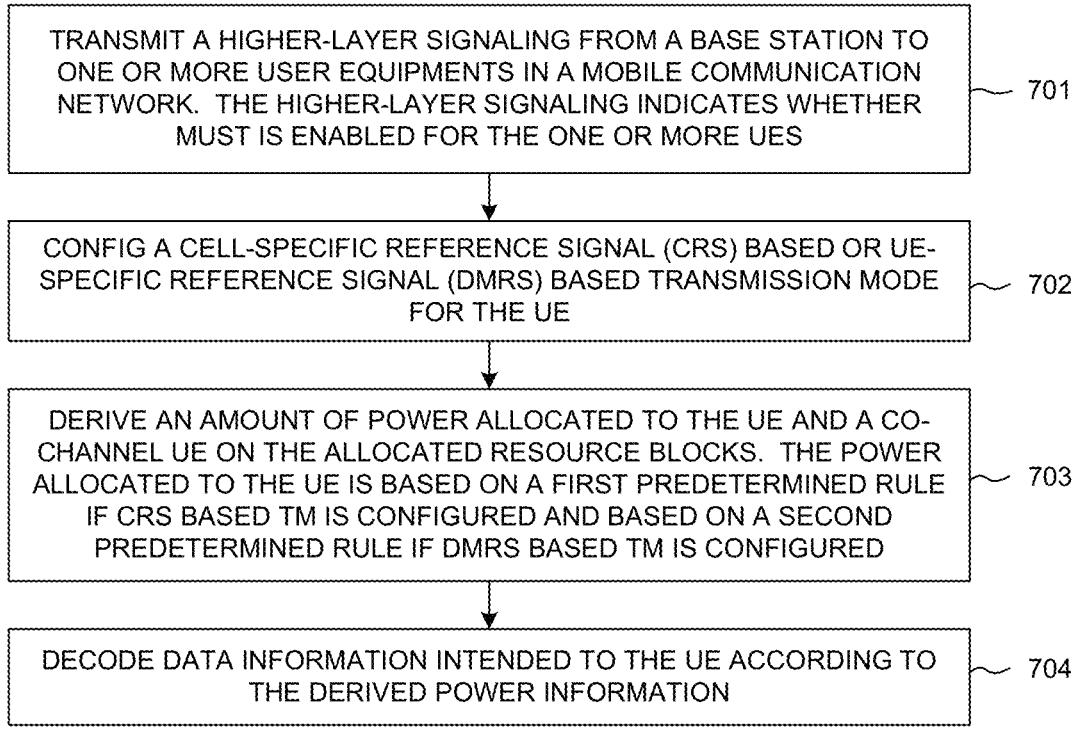
FIG. 7 is a flow chart of a method of power allocation for CRS-based and DMRS-based transmission mode under MUST operation in accordance with one novel aspect.

FIG. 7 is a flow chart of a method of power allocation for CRS-based and DMRS-based transmission mode under MUST operation in accordance with one novel aspect. In step 701, a user equipment (UE) receives a higher-layer signaling from a base station in a mobile communication network to determine whether multiuser superposition transmission (MUST) is enabled. In step 702, the UE is configured by the network to be in a cell-specific reference signal (CRS) based transmission mode or a UE-specific reference signal (DM-RS) based transmission mode. In step 703, the UE derives an amount of power allocated to the UE and a co-channel UE on the allocated resource blocks. The power allocated to the UE is based on a first predetermined rule if CRS based transmission mode is configured, and based on a second predetermined rule if DM-RS based transmission mode is configured. In step 704, the UE decodes data information intended to the UE according to the derived power information.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
receiving, from a base station by a user equipment (UE) in a mobile communication network, a higher-layer signaling via a protocol layer higher than a physical layer in a protocol stack, the higher-layer signaling indicating whether multiuser superposition transmission (MUST) is enabled for a downlink channel from the base station to the UE;
obtaining, from the higher-layer signaling, a first data to pilot (D2P) ratio for non-MUST transmission and a second D2P ratio for MUST transmission;
in a case that the MUST is determined as enabled, receiving, from the base station by the UE, a physical-layer control signaling via the physical layer in the protocol stack, the physical-layer control signaling containing MUST-related information indicating whether the MUST exists in a particular resource block allocated to the UE;
deriving an amount of transmission power allocated to the UE in the particular resource block, including:
in a case that the MUST is determined as not enabled or the MUST is determined as not existing in the particular resource block allocated to the UE, calculating, using the first D2P ratio and a cell-specific reference power, the amount of the transmission power allocated to the UE; and
in a case that the MUST is determined as enabled and the MUST is determined as existing in the particular resource block allocated to the UE, calculating, using the second D2P ratio and the cell-specific reference power, an amount of total transmission power for the particular resource block, and deriving the amount of the transmission power allocated to the UE based on the amount of the total transmission power and a power ratio of the amount of the transmission power allocated to the UE to the amount of the total transmission power; and
decoding data information intended to the UE according to the derived amount of the transmission power allocated to the UE.

2. The method of claim 1, wherein the first D2P ratio is derived from a parameter received via the higher-layer signaling.

3. The method of claim 1, wherein the MUST-related information comprises an indication of a modulation order or a modulation and coding scheme (MCS) used by data transmission intended for a co-channel UE.

4. The method of claim 1, wherein the MUST-related information further indicates the power ratio of the amount of the transmission power allocated to the UE to the amount of the total transmission power.

5. The method of claim 1, wherein the MUST-related information comprises an indication that a set of allocated resource blocks for at least the UE and a co-channel UE is the same.

6. The method of claim 1, wherein, in a case that the MUST is determined as enabled:
the UE is a near-UE and a co-channel UE is a far-UE, and
the far-UE is assigned to use Quadrature Phase Shift Keying (QPSK) for Physical Downlink Shared Channel (PDSCH) transmission and is configured to support Network-Assisted Interference Cancellation and Suppression (NAICS).

7. A user equipment (UE), comprising:
a receiver configured to receive, from a base station in a mobile communication network, a higher-layer signaling via a protocol layer higher than a physical layer in a protocol stack, the higher-layer signaling indicating whether multiuser superposition transmission (MUST) is enabled for a downlink channel from the base station to the UE; and
processing circuitry configured to:
obtain, from the higher-layer signaling, a first data to pilot (D2P) ratio for non-MUST transmission and a second D2P ratio for MUST transmission;
in a case that the MUST is determined as enabled, receive, from the base station, a physical-layer control signaling via the physical layer in the protocol stack, the physical-layer control signaling containing MUST-related information indicating whether the MUST exists in a particular resource block allocated to the UE;
derive an amount of transmission power allocated to the UE in the particular resource block, including:
in a case that the MUST is determined as not enabled or the MUST is determined as not existing in the particular resource block allocated to the UE, calculating, using the first D2P ratio and a cell-specific reference power, the amount of the transmission power allocated to the UE; and
in a case that the MUST is determined as enabled and the MUST is determined as existing in the particular resource block allocated to the UE, calculating, using the second D2P ratio and the cell-specific reference power, an amount of total transmission power for the particular resource block, and deriving the amount of the transmission power allocated to the UE based on the amount of the total transmission power and a power ratio of the amount of the transmission power allocated to the UE to the amount of the total transmission power; and
decode data information intended to the UE according to the derived amount of the transmission power allocated to the UE.

8. The UE of claim 7, wherein the first D2P ratio is derived from a parameter received via the higher-layer signaling.

9. The UE of claim 7, wherein the MUST-related information comprises an indication of a modulation order or a modulation and coding scheme (MCS) used by data transmission intended for a co-channel UE.

10. The UE of claim 7, wherein the MUST-related information further indicates the power ratio of the amount of the transmission power allocated to the UE to the amount of the total transmission power.

11. The UE of claim 7, wherein the MUST-related information comprises an indication that a set of allocated resource blocks for at least the UE and a co-channel UE is the same.

12. The UE of claim 7, wherein, in a case that the MUST is determined as enabled:
the UE is a near-UE and a co-channel UE is a far-UE, and
the far-UE is assigned to use Quadrature Phase Shift Keying (QPSK) for Physical Downlink Shared Channel (PDSCH) transmission and is configured to support Network-Assisted Interference Cancellation and Suppression (NAICS).

13. A method, comprising:
receiving, from a base station by a user equipment (UE) in a mobile communication network, a higher-layer signaling via a protocol layer higher than a physical layer in a protocol stack, the higher-layer signaling indicating whether multiuser superposition transmission (MUST) is enabled for a downlink channel from the base station to the UE;
obtaining, from the higher-layer signaling, a first data to pilot (D2P) ratio for non-MUST transmission and a second D2P ratio for MUST transmission;
configuring a cell-specific reference signal (CRS) based or UE-specific reference signal (DM RS) based transmission mode for the UE;
deriving an amount of transmission power allocated to the UE in a particular resource block, including:
in a case that the CRS based transmission mode is configured, and the MUST is determined as not enabled or the MUST is determined as not existing in the particular resource block allocated to the UE, calculating, using the first D2P ratio and a cell-specific reference power, the amount of the transmission power allocated to the UE;
in a case that the MUST is determined as enabled and the MUST is determined as existing in the particular resource block allocated to the UE and the CRS based transmission mode is configured, calculating, using the second D2P ratio and the cell-specific reference power, an amount of total transmission power for the particular resource block, and deriving the amount of the transmission power allocated to the UE based on the amount of the total transmission power and a power ratio of the amount of the transmission power allocated to the UE to the amount of the total transmission power; and
in a case that the MUST is determined as enabled and the MUST is determined as existing in the particular resource block allocated to the UE and the DM-RS based transmission mode is configured, deriving the amount of the transmission power allocated to the UE based on a detected reference power and the power ratio of the amount of the transmission power allocated to the UE to the amount of the total transmission power; and
decoding data information intended to the UE according to the derived amount of the transmission power allocated to the UE.

14. The method of claim 13, wherein the UE receives information of the power ratio that is dynamically signaled from the network.

15. The method of claim 13, wherein, in a case that the MUST is determined as enabled:
the UE is a near-UE and a co-channel UE is a far-UE, and
the far-UE is assigned to use Quadrature Phase Shift Keying (QPSK) for Physical Downlink Shared Channel (PDSCH) transmission and is configured to support Network-Assisted Interference Cancellation and Suppression (NAICS).

16. The method of claim 4, wherein
the power ratio of the amount of the transmission power allocated to the UE to the amount of the total transmission power is provided via the physical-layer control signaling.

17. The method of claim 1, wherein the higher-layer signaling corresponds to Radio Resource Control (RRC) layer signaling.

18. The UE of claim 7, wherein the higher-layer signaling corresponds to Radio Resource Control (RRC) layer signaling.

19. The method of claim 13, wherein the higher-layer signaling corresponds to Radio Resource Control (RRC) layer signaling.

* * * * *